C. D. Read.
Apple Corer and Cutter.
Nº 87,004. Patented Feb. 16, 1869.
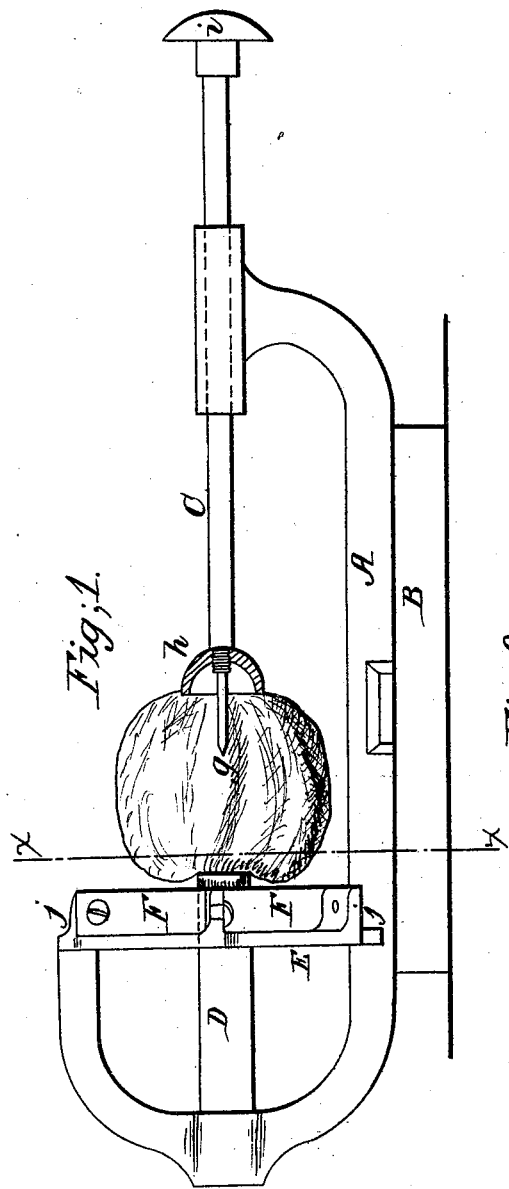
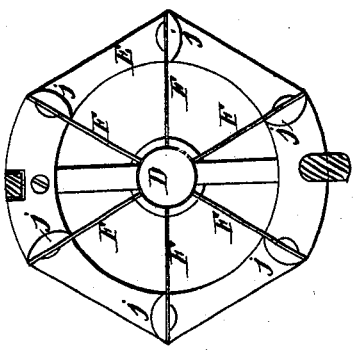
Witnesses;
A. W. Almqvist
Wm A Morgan
Inventor;
C. D. Read
per Munn & Co
Attorneys.

C. D. READ, OF LOWELL, MASSACHUSETTS.

Letters Patent No. 87,004, dated February 16, 1869.

IMPROVED APPLE-CORER AND CUTTER.

The Schedule referred to in these Letters Patent and making part of the same

*To all whom it may concern:*

Be it known that I, C. D. READ, of Lowell, in the county of Middlesex, and State of Massachusetts, have invented a new and useful Improvement in Apple-Corer and Cutter; and I do hereby declare that the following is a full, clear, and exact description thereof, which will enable those skilled in the art to make and use the same, reference being had to the accompanying drawings, forming part of this specification.

This invention relates to an improved machine for coring and slicing apples; and It consists in the combination of parts, as will be hereinafter more fully described.

Figure 1 is a longitudinal side view of the machine, showing the operation, an apple being seen, in red color, attached to the spindle.

Figure 2 is a vertical cross-section of fig. 1, through the line $x\ x$.

Similar letters of reference indicate corresponding parts.

A represents a curved bar which is attached to the bed-plate B, and which supports the spindle C, and one end of the core-tube D, as seen in the drawing.

E is the cutter-head, which is rigidly attached to the bar A, by locking on at the bottom, and by a single screw at the top.

The core-tube D is connected with the head E by the cutting-knives F, by means of lugs on the head, and is central therewith, as seen in fig. 2, and at right angles to and central with the spindle C.

$g$ is a point projecting from the end of the spindle, and $h$ is a detachable cone on the end of the spindle.

The operation will be readily understood from the drawing.

The apple is placed upon the point $g$ of the spindle, as seen in the drawing, and then crowded against the core-tube and knives F, by a blow of the hand on the knob $i$.

It will be seen that the core of the apple will be taken out by the core-tube, and that the apple will be cut into as many pieces as there are knives in the head.

The cores will be discharged from the other end of the tube.

In this example of my invention there are six knives, but I do not confine myself to that or any other particular number.

In forcing the apple on to the knives and core-tube, the cone $h$ bears against the apple, as seen in the drawing.

The knives are attached to the head by lugs, as seen at $j$.

I claim as new, and desire to secure by Letters Patent—

The combination of the curved bar A, head E, radial cutters F, tube D, horizontally-sliding rod C, cone $h$, and prong $g$, all arranged as described, for the purpose specified.

C. D. READ.

Witnesses:
CHAS. A. F. SWAN,
GEO. D. WOODMAN.